United States Patent
Choi

(10) Patent No.: US 8,285,334 B2
(45) Date of Patent: Oct. 9, 2012

(54) MOBILE COMMUNICATIONS TERMINAL FOR BROADCAST RECEPTION

(75) Inventor: Kwang-Hun Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 724 days.

(21) Appl. No.: 12/187,532

(22) Filed: Aug. 7, 2008

(65) Prior Publication Data

US 2009/0042620 A1 Feb. 12, 2009

(30) Foreign Application Priority Data

Aug. 8, 2007 (KR) ........................ 10-2007-0079753

(51) Int. Cl.
*H04B 1/00* (2006.01)

(52) U.S. Cl. ..... 455/566; 455/3.01; 455/3.02; 455/3.03; 455/3.05; 455/3.06; 725/40; 725/100; 725/135; 725/37; 725/112

(58) Field of Classification Search ........ 455/3.01–3.06; 725/40, 135, 100, 37

See application file for complete search history.

(56) References Cited

U.S. PATENT DOCUMENTS

2005/0278737 A1* 12/2005 Ma et al. .......................... 725/40
2006/0248570 A1* 11/2006 Witwer ........................ 725/135

FOREIGN PATENT DOCUMENTS

| CN | 1713681 A | 12/2005 |
| CN | 1866256 A | 11/2006 |
| KR | 10-0605652 A | 5/2005 |
| WO | WO-97/13368 A1 | 4/1997 |
| WO | WO-2005/045803 A2 | 5/2005 |

* cited by examiner

*Primary Examiner* — Fayyaz Alam
(74) *Attorney, Agent, or Firm* — Birch, Stewart, Kolasch & Birch, LLP

(57) ABSTRACT

A mobile communication terminal including a controller configured to access a web page for receiving a broadcast when the terminal enters a broadcast mode for receiving the broadcast, a display configured to display the accessed web page, and a receiving unit configured to receive channel information related to the broadcast and linked to a specific information entity selected on the web page.

17 Claims, 8 Drawing Sheets

US 8,285,334 B2

MOBILE COMMUNICATIONS TERMINAL FOR BROADCAST RECEPTION

This application claims priority to Korean Patent Application No. 10-2007-0079753 filed on Aug. 8, 2007 in Korea, the entire contents of which is hereby incorporated by reference in its entirety.

BACKGROUND OF THE INVENTION

1. Field of the Invention

The present invention relates to a mobile communication terminal and corresponding method of controlling a mobile communication terminal, and in particular, a mobile communication terminal and corresponding method for receiving a digital multimedia broadcast.

2. Description of the Background Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

In more detail, analog broadcasting was originally developed for reception by fixed devices. Thus, when a user receives the audio broadcasting while walking or driving a vehicle, the sound quality of the audio broadcasting is significantly lowered, which results in a higher output and wider frequency band being needed.

Digital broadcasting has been introduced to solve many of the problems with analog broadcasting. Examples of such digital audio broadcasting systems include the DAB (Digital Audio Broadcasting) system in Europe, where the Eureka-147 standard has been adopted as the DAB standard, the DAR (Digital Audio Radio) system in the United States, the DRB (Digital Radio Broadcasting) system in Canada, the DSB (Digital Sound Broadcasting) system for the ITU-R (International Telecommunication Union), and the DMB (Digital Multimedia Broadcasting) in Korea.

The above-noted digital audio broadcasting techniques were developed for the next generation broadcasting system, and therefore are sufficiently robust to be compatible with electromagnetic wave environments and with noise in downtown areas. Thus, even when the transmissions have low power, the electric waves carrying sound with a CD level of quality can be received in a vehicle that is moving at high speed.

Further, the original concept of audio broadcasting has now broadened to include video and audio broadcasting. Therefore, broadcasting companies or providers can now provide broadcasting services that include audio and video broadcasts, multimedia broadcasts such as news, traffic information, weather information, geographic and location information, video information, etc.

However, the user is not given much flexibility when selecting a broadcast to watch. That is, the user selects a particular broadcasting channel and then the broadcast is immediately displayed on their terminal.

SUMMARY OF THE INVENTION

Accordingly, an object of the present invention is to address the above-noted and other problems.

Another object of the present invention is to provide a mobile communication terminal and corresponding method for accessing a specific broadcast channel or program from a displayed web browser.

Yet another object of the present invention is to provide a mobile communication terminal and corresponding method for accessing a specific channel by receiving link information from a broadcast exclusive web in which a concept of ESG information (or EPG information) is extended.

Still another object of the present invention is to provide a mobile communication terminal and corresponding method for accessing a specific channel based upon ESG or EPG information after receiving minimum information from the broadcast exclusive web.

Yet another object of the present invention to provide a mobile communication terminal and corresponding method for accessing a specific channel on a general web.

To achieve these and other advantages and in accordance with the purpose of the present invention, as embodied and broadly described herein, the present invention provides in one aspect a mobile communication terminal including a controller configured to access a web page for receiving a broadcast when the terminal enters a broadcast mode for receiving the broadcast, a display configured to display the accessed web page, and a receiving unit configured to receive channel information related to the broadcast and linked to a specific information entity selected on the web page.

In another aspect, the present invention provides a method of operating a mobile communication terminal, and which includes accessing a web page for receiving a broadcast when the terminal enters a broadcast mode for receiving the broadcast, displaying the accessed web page, and displaying a broadcast based on received channel information related to the broadcast and linked to a specific information entity selected on the web page Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
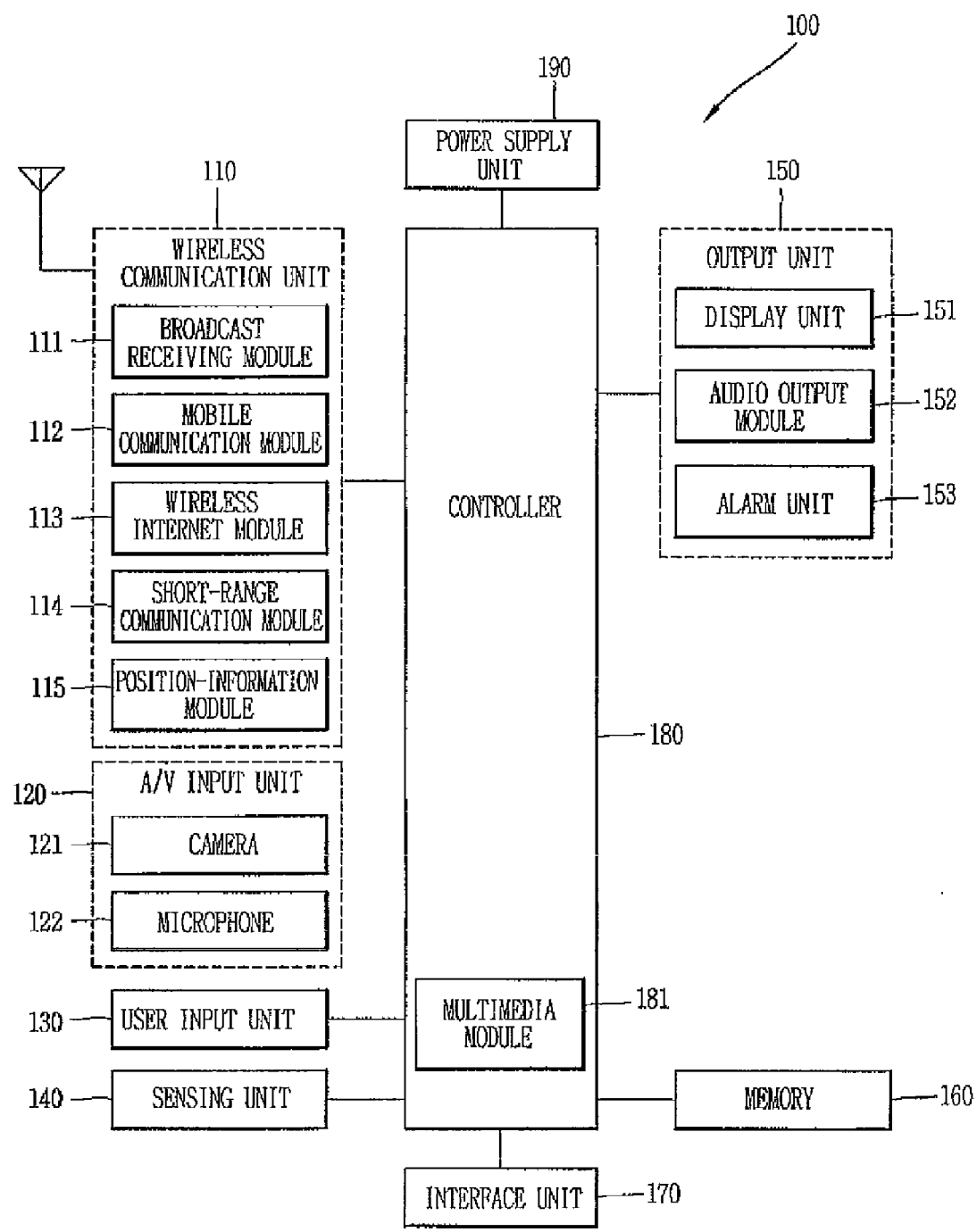
FIG. 1 is a block diagram illustrating a mobile terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system or server which transmits a broadcast signal and/or broadcast associated information, and a system or server which receives a pre-generated broadcast signal and/or broadcast associated information and send the signal and information to the mobile terminal. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal. Further, the broadcast associated information may be provided via a mobile communication network, and received by the mobile communication module 112.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B, an external mobile terminal, a server, etc). Such signals may represent audio, video, multimedia, control signaling, text/multimedia messages and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct and error by one satellite. The GPS module can also obtain three-dimensional speed information and an accurate time, as well as position on latitude, longitude and altitude, from the position information received from the satellites.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video, which can then be displayed on a display unit 151.

Further, the microphone 122 receives an external audio signal while the portable device is in a particular mode, such as a phone call mode, recording mode and voice recognition mode. The received audio signal is then processed and converted into digital data. The processed digital data is converted for output into a format transmittable to a mobile communication base station via the mobile communication module 112 in case of the phone call mode. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card, a subscriber identity module (SIM) card, a user identity module (UIM) card, a removable user identity module (RUIM) card, etc.), audio input/output ports and video input/output ports.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

The memory 160 is used to store a program for the processing and control of the controller 180, various broadcast contents, a channel list, a supportable language list, a database of the mobile terminal, additional information on a broadcast channel (i.e., ESG or EPG), and the like, and also temporarily stores input/output data (e.g., phonebook data, messages, still images, video, etc.). The memory 160 may store an application for performing contents uploading/downloading by accessing a specific web or a general web for a broadcast reception. Further, the controller 180 may perform a website (webpage) access or contents uploading/downloading according to various commands or data applied from the application.

In addition, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device. Also, the mobile terminal 100 may operate a web storage which performs the storage function of the memory 160 on the Internet.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2:
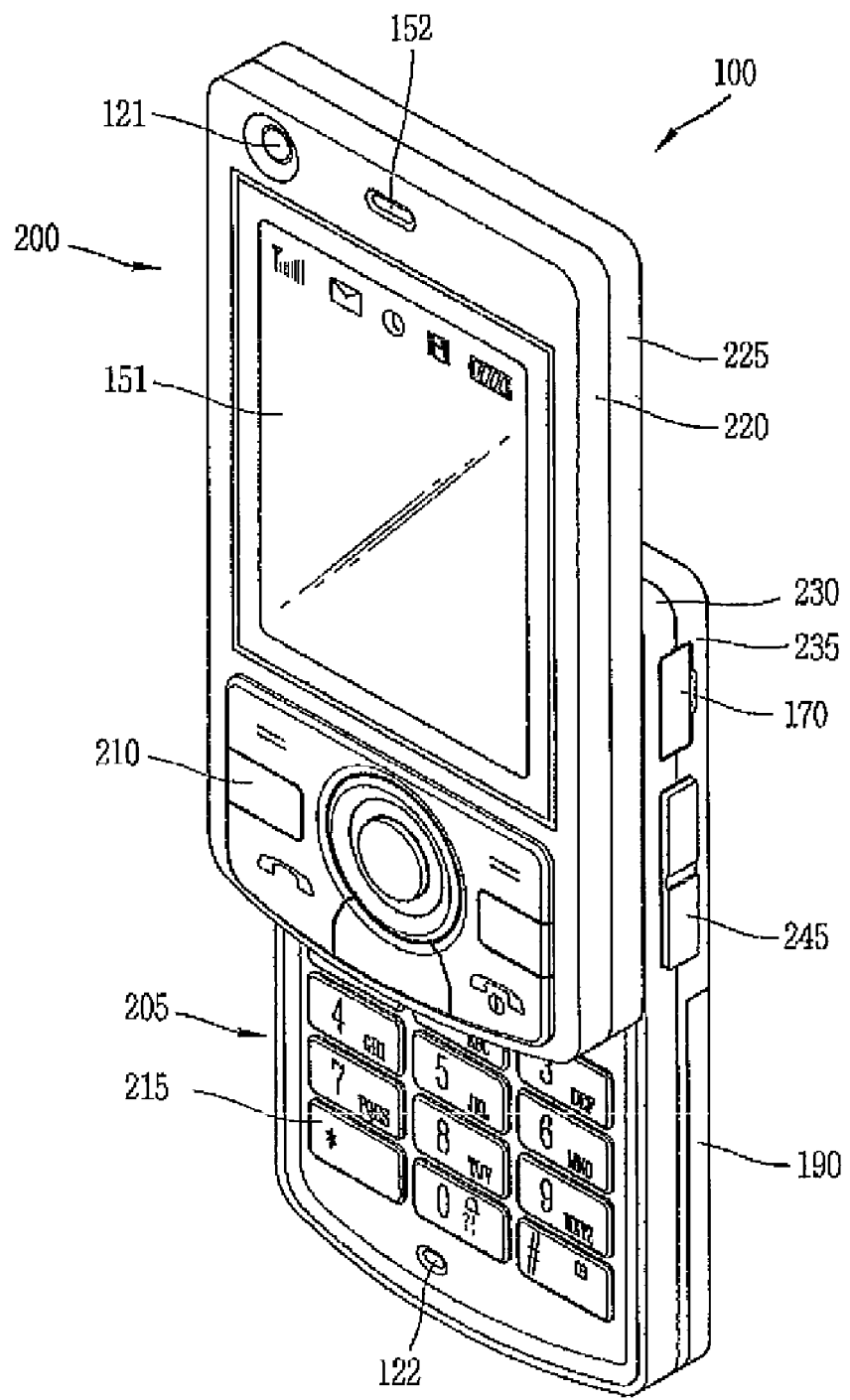
FIG. 2 is a front view of a mobile terminal according to an embodiment of the present invention.

Next, FIG. 2 is a front side view of the mobile terminal 100 according to an embodiment of the present invention. As shown in FIG. 2, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 3:
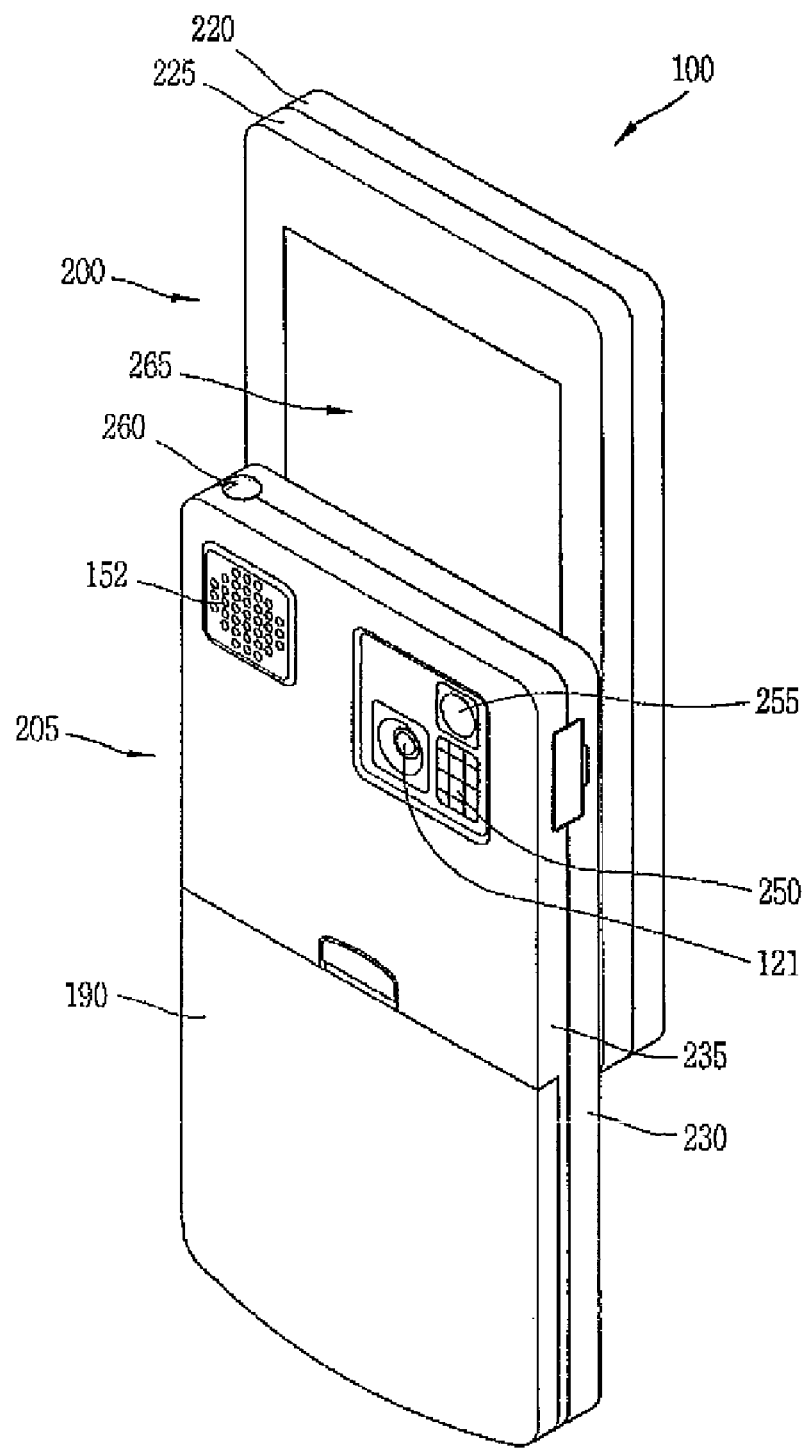
FIG. 3 is a rear view of a mobile terminal according to an embodiment of the present invention.

FIG. 3 is a rear side view of the mobile terminal 100 shown in FIG. 2. As shown in FIG. 3, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 3) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
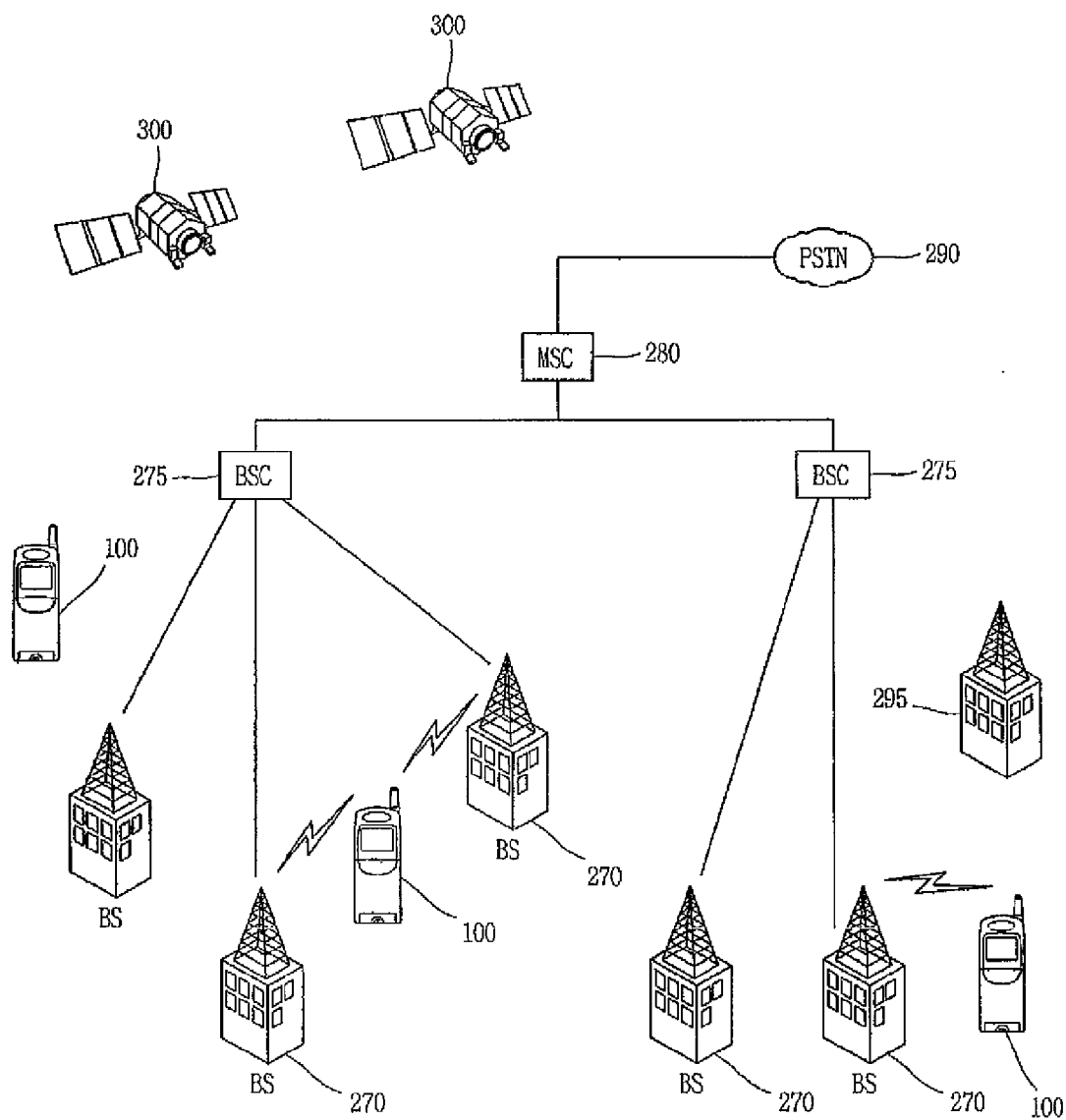
FIG. 4 is a block diagram illustrating a radio communications system according to an embodiment of the present invention in which the mobile terminal in FIGS. 1-3 can operate.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or xDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof.

Embodiments of the present invention relate to a method for accessing a specific channel on a web browser. In one embodiment, a specific broadcast channel is accessed by launching a web page which provides additional information related to a broadcast. In another embodiment, a specific broadcast channel is accessed from a general web page, and in yet another embodiment, a specific channel is accessed by mapping a specific word on a web page with the corresponding channel. These different embodiments will now be described in more detail.

---

(Embodiment 1)

A specific channel is accessed by displaying a web page which provides extended ESG (Electronic Services Guide) or Electronic Program Guide (EPG) information, namely, the access of the terminal to the channel by receiving link information from the displayed web page.

---

When a user inputs or presses a specific button (a hard button, a touch screen button, a dial wheel, etc.) for watching a broadcast program on their terminal, the mobile terminal is switched into a broadcast mode so as to receive a broadcast stream via the broadcast receiving module 111 (FIG. 1). The received broadcast stream is then decoded, such that the received audio and video streams in the broadcast stream are decoded into a sound or audio signal and an image or video signal. The decoded signals are then provided to the user as one complete broadcast content through the display unit 151 and audio output module 152.

According to this embodiment of the present invention, when the user presses a button for viewing the broadcast, the controller 180 accesses and displays a preset web page on the display unit 151. Then, when the user selects a certain information entity such as a still or moving image, a particular word or phase, etc. to which a hyperlink is set, the controller 180 accordingly accesses a linked channel or a broadcast program.

Figure 5:
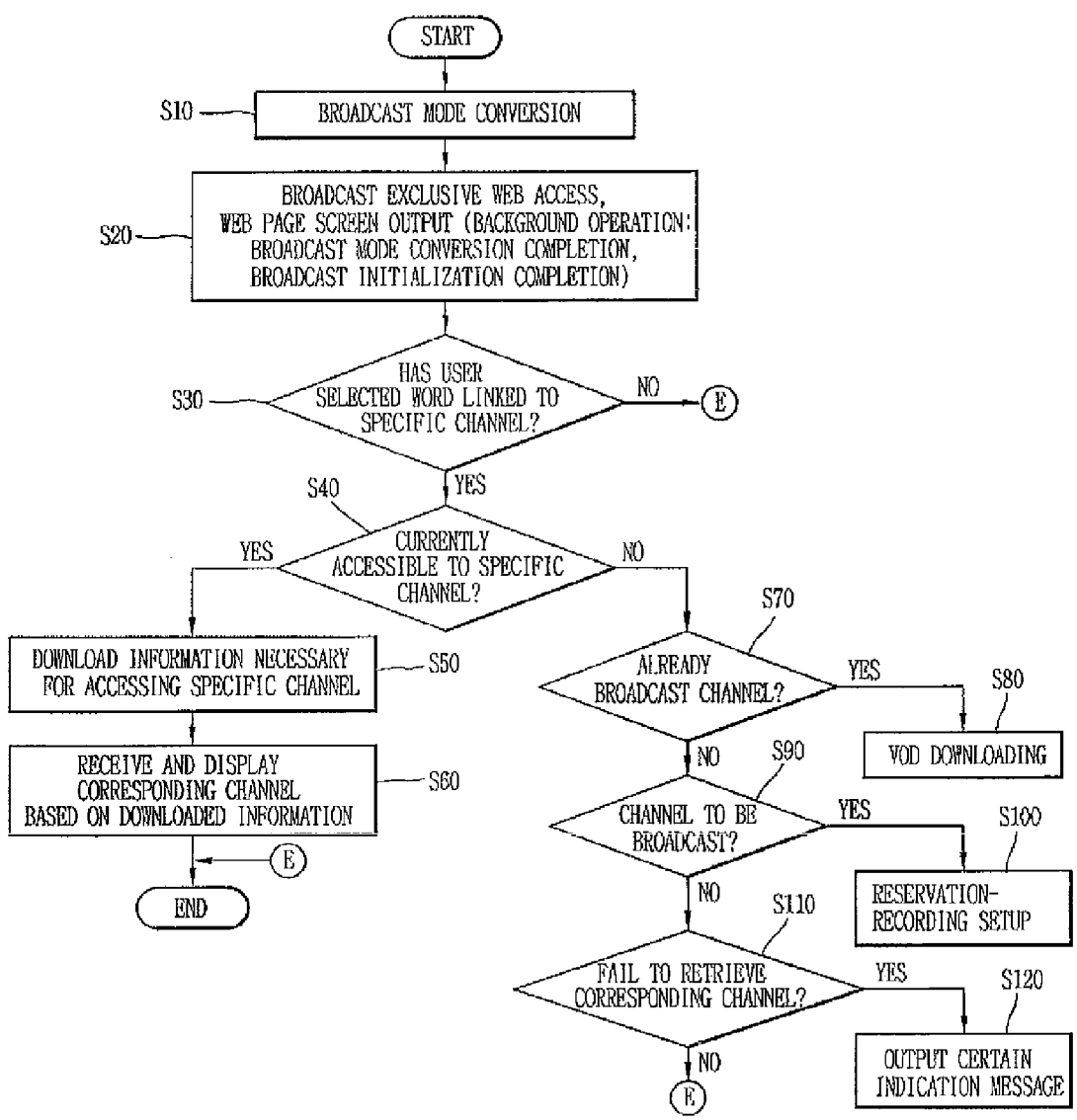
FIG. 5 is a flowchart illustrating a method of operating a mobile terminal according to a first embodiment of the present invention.

In more detail, FIG. 5 is a flowchart illustrating a method of operating or controlling a mobile terminal according to the first embodiment of the present invention. FIG. 1 will also be referred to throughout the description of the invention.

As discussed above, in this embodiment, a specific channel is accessed by displaying a web page that includes extended ESG or EPG information. That is, the web page includes additional information beyond the information provided by the ESG or EPG.

As shown in FIG. 5, when a user presses or selects a button for viewing a broadcast (broadcast program), the controller 180 first converts the state of the mobile terminal into a broadcast mode (S10). In addition, rather than immediately displaying a broadcast of a specific, preset or default channel, the controller 180 accesses a particular web provided by a communication carrier and displays a particular web page of the corresponding web (S20).

Further, the processes for accessing the web are not limited to those in steps S10 and S20. That is, the state of the mobile terminal may be converted into a broadcast mode after a user accesses a web (a specific web or general web for a broadcast reception). Alternatively, the controller 180 can execute an automatic mode conversion while a user is accessing a web.

In addition, the web or specific web is a digital broadcast exclusive web provided by a communication carrier (hereinafter, referred to as 'exclusive web'). The web or web page(s) characteristically provide a user with more detailed and a greater amount of information (e.g., channel list information, information on news and contents associated with a corresponding channel, and the like) than the typical additional information (e.g., ESG or EPG information) provided by a broadcast channel.

For example, a drama channel may provide entertainment related information, e.g., update or gossip information about entertainers (casts), VOD (Video On Demand) services, program information, etc. In another example, a sports channel may provide VOD services for big matches or games in which star players participated, record information related to individual players, leagues or teams. Thus, via the exclusive web, the mobile terminal can provide a user with a great deal of broadcast related information which is not provided via the existing additional information (e.g., ESG or EPG information) provided by the broadcast channel. In addition, the exclusive web may include a hyperlink having a link set to an associated channel by using a particular phase or word as a keyword.

Further, as shown in step S20, when the user accesses the exclusive web, the controller 180 converts the state of the mobile terminal into the broadcast mode and accordingly completes an initialization operation. The controller 180 then performs a frequency searching or channel retrieval operation based upon the user's location and/or position information, to thusly allow the user to watch a particular broadcast when he or she desires to view the broadcast (S20).

Then, as shown in FIG. 5, when the user who is accessing the exclusive web selects a word, phase, still or moving image, etc. linked to a specific channel or a broadcast program (Yes in S30), the controller 180 downloads information (e.g., Packet ID (PID), Session Description Protocol (SDP), service IP, service number, etc.) used to access the selected specific channel from the exclusive web (S40 and S50).

However, if the linked channel or broadcast program is not currently allowed to be accessed (No is S40), for example, if it is a drama or a sports game, etc. that has already been broadcast (S70) or is to be broadcast (S90), or if the channel has a weak sensitivity level for reception or cannot be searched at a position where the user is located (S110), the mobile terminal downloads a VOD from the exclusive web (S80), or displays scheduling information (e.g., a time-table or a schedule list) related to the corresponding channel or program to the user, thereby allowing the user to set a reservation-recording for the broadcast program (S100), or displays an indication message indicating why the selected channel or broadcast program is not accessible (S120).

Further, if the linked channel or broadcast program is currently allowed to be accessed (Yes in S40) and the information required for the channel access is successfully downloaded in the mobile terminal (S50), the mobile terminal refers to the received information so as to receive the broadcast of the corresponding channel and displays the broadcast to the user (S60).

Further, when the information required for the channel access is successfully downloaded in the mobile terminal in step S50, but the mobile terminal is not granted permission to view the linked channel, the mobile terminal may display purchasing related information to the user so as to question the user about his or her interest in purchasing the linked channel.

Thus, according to the first embodiment of the present invention, the broadcasting system does not need to transmit additional information (e.g., ESG information or EPG information) related to broadcast to the mobile terminal, but rather the terminal accesses a web that provides a web page the user access first and then is transferred to the specific broadcast channel or program after selecting an item on the web page.

That is, in this embodiment, after the terminal is converted into the broadcast mode, the mobile terminal accesses a specific web provided by a communication carrier so as to display a variety of channel information and contents onto a web page and then access each broadcast channel via the web page instead of immediately displaying the broadcast of a preset or default.

Accordingly, the mobile terminal provides the user with more detailed and greater amount of broadcast associated information than information provided via the existing broadcast associated additional information (e.g., ESG or EPG information). Further, the broadcasting system according to the embodiment of the present invention more efficiently utilizes a broadcast frequency band, and provides users with more various services with higher quality.

---

(Embodiment 2)

A specific channel is accessed by launching a web page providing extended ESG information, namely, the channel is accessed based upon ESG information of a mobile terminal without receiving link information from a web page.

---

Figure 6:
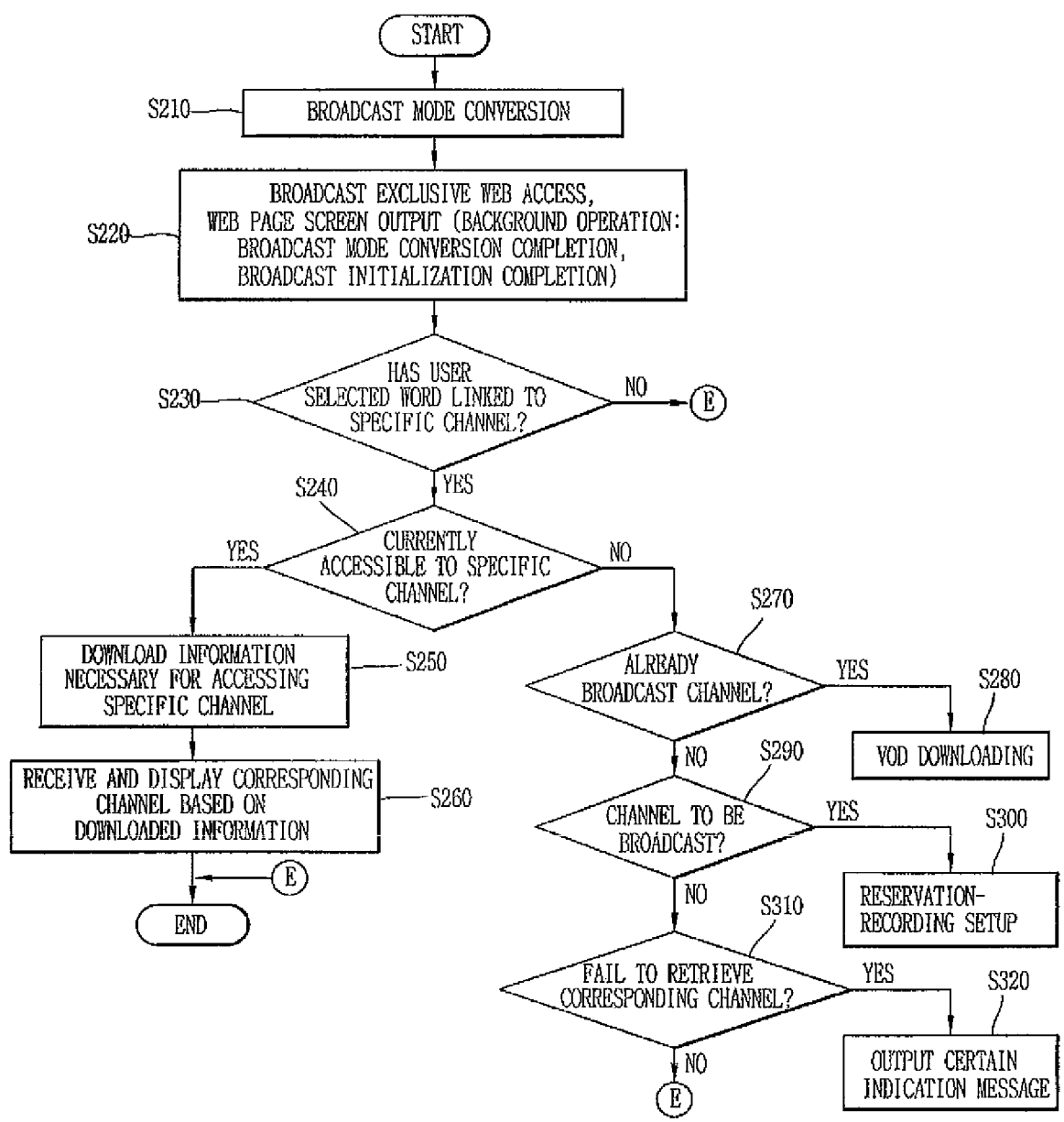
FIG. 6 is a flowchart illustrating a method of operating a mobile terminal according to a second embodiment of the present invention.

FIG. 6 is a flowchart illustrating an operation of a mobile terminal according to the second embodiment of the present invention. As shown in FIG. 6, when a user presses or selects a button for viewing a broadcast, the controller 180 converts the state of the mobile terminal into a broadcast mode (S210). The controller 180 then accesses an exclusive web provided by a communication carrier to display a specific web page of the corresponding web, instead of immediately displaying a broadcast of a specific, preset or default channel (S220).

As discussed above with respect to the first embodiment, the exclusive web provides the user with more detailed and a greater amount of information (e.g., channel list information, information on news and contents associated with a corresponding channel, and the like) than the standard additional information (e.g., the ESG and EPG information) provided by a broadcast channel.

For example, and as mentioned above, a drama channel may provide entertainment related information, e.g., update or gossip information about entertainers (casts), VOD services, program information and the like. Similarly, a sports channel may provide VOD services for big matches or games in which star players participated, record information related to individual players, leagues or teams, etc.

Thus, via the exclusive web, the mobile terminal can provide a user with a greater amount of broadcast associated information which is not provided via the existing additional information (e.g., ESG or EPG information) provided by the broadcast channel. In addition, the exclusive web may include a hyperlink having a link set to an associated channel by using a particular phase or word as a keyword.

Therefore, in step S220, when the user accesses the exclusive web, the controller 180 converts the state of the mobile terminal into the broadcast mode and accordingly completes an initialization operation. The controller 180 then performs a frequency searching or channel retrieval operation based on the user's location and/or position information, to thusly allow the user to watch the broadcast.

Then, when the user selects a word, phase, still or moving image, etc. that is linked to a specific channel or broadcast program (Yes in S230), the controller 180 determines if the mobile terminal can access the specific channel (S240), and when the mobile terminal can access the specific channel (Yes in S240), the controller 180 downloads a minimum amount of information (e.g., a service ID) required to access the selected specific channel from the exclusive web (S250).

The controller 180 then refers to the minimum information received and additional information (e.g., the ESG or EPG information) related to the broadcast channel, and then receives and displays the broadcast of the corresponding channel (S260). For example, upon receiving the service ID as the minimum information, the mobile terminal detects channel access information (e.g., PID, SDP, service number, etc.) related to the received service ID from the additional information (e.g., ESG or EPG information) related to the broadcast channel.

The mobile terminal then receives the broadcast of the corresponding channel based on the detected information and displays the received broadcast to the user (S260). Further, the minimum information downloaded from the exclusive web may be information indicating the selected word as it is. In this instance, the controller 180 downloads only information as to which word the user has selected.

In addition, if the linked channel or broadcast program is not currently allowed to be accessed (No in S240), for example, if it is a drama or a sports game, etc. which has already been broadcast or is to be broadcast (S270 and S290), or if the channel has a weak sensitivity level for reception or cannot be searched at a user's position (S310), then the mobile terminal downloads a VOD from the exclusive web (S280), or displays a scheduling information (e.g., time-table or a schedule list) related to the corresponding channel or program to the user, thereby allowing the user to set a reservation-recording for the broadcast program (S300), or displays an indication message indicating why the selected channel or broadcast program is not accessible (S320).

Further, in step S250, when the information required for the channel access is successfully downloaded in the mobile terminal, but the mobile terminal is not granted permission to view the linked channel, the mobile terminal may display purchasing related information to the user to determine the user's interest in purchasing the linked channel.

| (Embodiment 3) |
| --- |
| A specific channel is accessed on a general web page |

Figure 7:
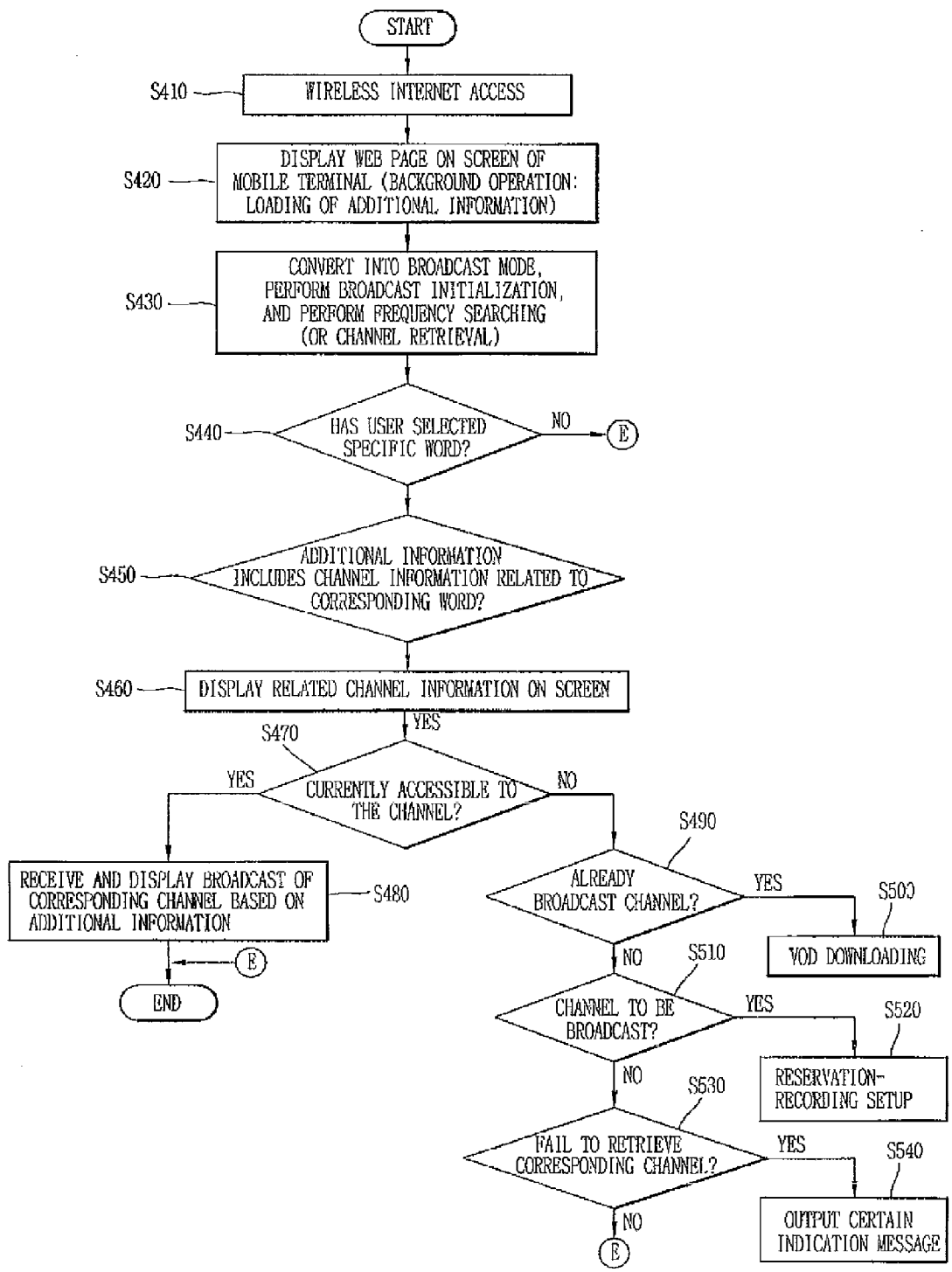
FIG. 7 is a flowchart illustrating a method of operating a mobile terminal according to a third embodiment of the present invention.

FIG. 7 is a flowchart illustrating an operation of a mobile terminal according to a third embodiment of the present invention. As shown in FIG. 7, when a user accesses a general web page using the wireless Internet (e.g., via a Wireless Application Protocol (WAP)) (S410), the web page including image(s) and text are displayed to the user on the display unit 151 (S420).

Further, in step S420, the controller 180 converts the state of the mobile terminal into a broadcast mode and performs a background operation such a frequency searching or channel retrieval operation based upon the user's location information, so as to allow the user to watch such broadcast immediately when he wants.

The user then moves a cursor or a selection prompt onto a specific still or moving image, a specific word or phase, etc. so as to select a particular item displayed on the web page (Yes in S440). In addition, in step S410, when the mobile terminal is connected to the wireless Internet, the controller 180 performs a background operation in step S420 and loads additional information (e.g., an ESG or EPG) of a broadcast channel stored in a general memory such as the memory 160, a particular storage area, etc.

The controller 180 then retrieves whether the additional information (e.g., ESG or EPG) includes information related to the word or phase on which the cursor is located, e.g., information related to a broadcast channel program (e.g., "1. CH.5 MTV access") or a broadcasting schedule (e.g., a time-table or schedule list, e.g., "2. MTV broadcasting schedule").

If the user moves the cursor onto an image or area for selection (Yes in S440), the controller 180 may use a title of the image area to thusly perform step S450, or pop up a separate input window on a screen and prompt the user to input a keyword related to the selected image, text, area, etc. so as to perform step S450.

In addition, the ESG or EPG contains a program guide that may include additional information on each broadcast program such as the casts and staffs, outline or synopsis, a broadcasting time, a producer and/or production company, planning company and the like. Further, the controller 180 may retrieve whether the ESG includes information related to the word on which the cursor is located.

Upon retrieving the related information from the ESG or EPG (Yes in S450), the controller 180 then displays the related information on a screen (S460). In addition, the controller 180 may repeatedly perform such retrieval and display operations in steps S450 and S460 each time the cursor on the screen moves onto a new word.

Figure 8:
FIG. 8 is an overview of a display screen of the mobile terminal according to the third embodiment of the present invention.

For example, FIG. 8 is an overview of a display screen of a mobile terminal according to this embodiment. That is, as shown in FIG. 8, the display screen includes a web page with a variety of text and image information. The user can then move the cursor over the word "MTV" and the controller 180 displays the information related to the word on which the cursor is located, e.g., information related to a broadcast channel program (e.g., "1. CH.5 MTV access") or a broadcasting schedule (e.g., a time-table or schedule list, e.g., "2. MTV broadcasting schedule").

Afterwards, when the user selects a broadcast channel or program among the related information displayed on the screen, the controller 180 determines whether the corresponding channel or broadcast program is allowed to be accessed based upon channel access information (e.g., PID, SDP, service IP, service number and the like) of the additional information (e.g., ESG or EPG information) (S470).

Similar to the first embodiment, if the selected channel or broadcast program is not currently allowable to be accessed (No in S470) including, for example, if it is a drama or a sports game, etc. which has already been broadcast or is to be broadcast (S490 and S510), or if the channel has a weak sensitivity level for reception or cannot be searched at a user's position (S530), the mobile terminal downloads a VOD from the exclusive web (S500) or displays a scheduling information (e.g., time-table or a schedule list) related to the corresponding channel or program to the user, thereby allowing the user to set a reservation-recording for the broadcast program (S520), or displays an indication message indicating why the selected channel or broadcast program is not accessible (S540).

In addition, if the corresponding channel or broadcast program is currently allowed to be accessed (Yes in S470), the mobile terminal refers to the received information so as to receive the broadcast of the corresponding channel and display it to the user (S480). Further, in step S470, if the mobile terminal is not granted permission to view the linked channel, the mobile terminal may display purchasing related information to the user to determine the user's interest in purchasing the linked channel, as the same as in the first embodiment.

As discussed above, embodiments of the present invention includes various methods for accessing a general web or a broadcast exclusive web to ultimately access a specific channel. In particular, by proposing a method by which a broadcast exclusive web providing extended additional information (e.g., ESG or EPG information) can be displayed so as to access a specific channel and a method by which text of a web page and link for a channel can be automatically set by using the DB of a mobile terminal, the user's convenience is enhanced and more various broadcast contents can be provided.

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile communication terminal, comprising:
   a display unit;
   a receiving unit;
   a memory; and
   a controller configured to:
      display a web page of an article associated with a broadcast channel program on the display unit when the web page is accessed via the Internet, wherein at least one item of the article is linked to the broadcast channel program, and wherein the at least one item is distinctly displayed from a remainder of the article on the display unit;
      load Electronic Service Guide (ESG) or Electronic Program Guide (EPG) of a channel carrying the broadcast channel program to the memory as a background operation;
      perform a retrieval operation of the channel to access the broadcast channel program; and
      receive broadcast of the channel corresponding to an item via the receiving unit in response to a selection of the item among the at least one item,
      wherein program information of the broadcast channel program associated with the item is displayed via a pop up window by accessing the ESG or EPG in the memory.

2. The terminal of claim 1, wherein the web page of the article comprises a web page of news and contents.

3. A method of operating a mobile communication terminal, the method comprising:
   displaying a web page of an article associated with a broadcast channel program on a display unit of the mobile communication terminal when the web page is accessed via the Internet, wherein at least one item of the article is linked to the broadcast channel program, and wherein the at least one item is distinctly displayed from a remainder of the article on the display unit;
   loading Electronic Service Guide (ESG) or Electronic Program Guide (EPG) of a channel carrying the broadcast channel program to a memory of the broadcast channel program as a background operation;
   performing a retrieval operation of the channel to access the broadcast channel program; and
   receiving broadcast of the channel corresponding to an item via a receiving unit of the mobile communication terminal in response to a selection of the item among the at least one item,
   wherein program information of the broadcast channel program associated with the item is displayed via a pop up window by accessing the ESG or EPG in the memory.

4. The terminal of claim 1, wherein the retrieval operation of the channel is performed based on location information of the mobile communication terminal.

5. The terminal of claim 1, wherein the controller is further configured to receive a Video On Demand (VOD) image of the broadcast channel program if the broadcast of the broadcast channel program has already been completed.

6. The terminal of claim 1, wherein the controller is further configured to receive schedule information of the broadcast channel program and to set a reservation-recording for the broadcast channel program if the broadcast of the broadcast channel program is scheduled in the future.

7. The terminal of claim 1, wherein the at least one item of the article is a word, a phrase, or a video still image.

8. The terminal of claim 1, wherein the web page is an exclusive web page exclusively provided by a server providing the broadcast.

9. The terminal of claim 1, wherein the controller is further configured to receive service ID, Packet ID (PID), Session Description Protocol (SDP), or service number related to the channel via the receiving unit.

10. The terminal of claim 1, wherein the web page is a general web page accessed by a user of the mobile communication terminal.

11. The method of claim 3,
   wherein the retrieval operation is performed based on location information of the mobile communication terminal.

12. The method of claim 3, further comprising:
   receiving a Video On Demand (VOD) image of the broadcast channel program if the broadcast of the broadcast channel program has already been completed.

13. The method of claim 3, further comprising:
   receiving schedule information of the broadcast channel program; and
   setting a reservation-recording for the broadcast channel program if the broadcast of the broadcast channel program is scheduled in the future.

14. The method of claim 3, wherein the at least one item of the article is a word, a phrase, a video or a still image.

15. The method of claim 3, wherein the web page is an exclusive web page exclusively provided by a server providing the broadcast.

16. The method of claim 3, further comprising receiving service ID, Packet ID (PID), Session Description Protocol (SDP), or service number related to the channel.

17. The method of claim 3, wherein the web page is a general web page accessed by a user of the terminal of the mobile communication terminal.

* * * * *